Patented Sept. 13, 1932

1,876,842

UNITED STATES PATENT OFFICE

OTTO BÖGER, OF DESSAU IN ANHEIM, AND OSWALD MEISSNER, OF UERDINGEN-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

NEW DYESTUFFS OF THE DIAMINO-TRIPHENYMETHANE SERIES

No Drawing. Application filed April 3, 1928, Serial No. 267,130, and in Germany April 23, 1927.

The condensation of benzaldehyde-disulphonic acids with dimethyl-, diethyl- or dibenzyl-derivatives of amino-benzene or monomethyl-, monoethyl- or monobenzyl-derivatives of 2-amino-1-methylbenzene yields blue dyestuffs of equalizing properties and fast to alkali.

By the present invention new blue dyestuffs of very good equalizing properties, fast to alkali and of considerably greater coloring power than those referred to above, are made by condensing a benzaldehyde disulphonic acid with an N-alkylated aryl-amine, the alkyl-group containing at least three carbon atoms. Such alkyl-aryl-amines are made, for instance, by interaction of an arylamine with 2-chloropropane or 2-chlorobutane.

The free acids of the dyestuffs may be represented by the general formula:

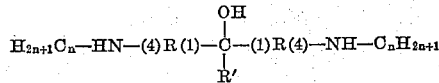

R meaning an aromatic radicle of the benzene series, R' meaning the radicle of a benzene disulphonic acid and $n$ standing for a whole number greater than 2.

In the dry shape of their sodium salts the new dyestuffs are dark powders soluble in water with a blue color and dyeing wool blue tints distinguished by uniformity and by remarkable clearness and beauty, even in artificial light.

The following example, the parts being by weight, illustrates the invention:

26.6 parts of benzaldehyde 2.4-disulphonic acid are condensed in the usual manner in dilute sulphuric acid with 37 parts of 2-mono-1'-methylpropylamino-1-methyl-benzene. The leuco-compound thus precipitated is oxidized in the known manner by means of potassium bichromate in presence of oxalic acid and sulphuric acid. By salting out there are obtained 57.4 parts of a dyestuff free from salt, which dye wool and silk as strongly as double its weight of the corresponding dyestuff from benzaldehyde 2.4-disulphonic acid and 2-monoethylamino-1-methyl-benzene dyes wool and silk. The dyestuff is a salt of an acid which may be represented by the formula

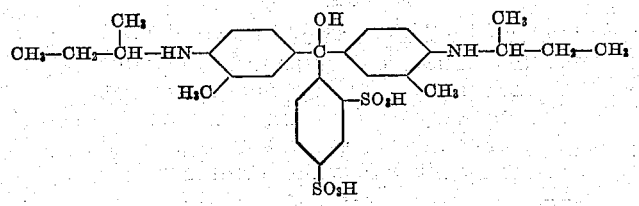

With like result benzaldehyde 2.5-disulphonic acid for instance, and 2-isopropylamino-1-methyl-benzene, among others, may be used.

What we claim is:

1. The new dyestuffs of the diamino-triphenylmethane series being salts of an acid represented by the general formula:

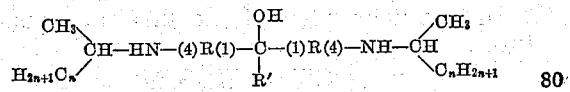

R meaning an aromatic radicle of the benzene series, R' meaning the radicle of a benzene disulphonic acid and $n$ standing for a whole number; these dyestuffs in the shape of their dry sodium salts being dark powders soluble in water with a blue color and dyeing wool blue tints.

2. The new dyestuffs of the diamino-triphenylmethane series being salts of an acid represented by the general formula:

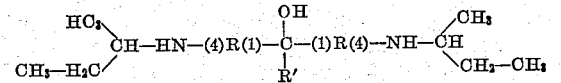

R meaning an aromatic radicle of the benzene series and R' meaning the radicle of a benzene disulphonic acid; these dyestuffs in the shape of their dry sodium salts being dark powders soluble in water with a blue color and dyeing wool blue tints.

3. The new dyestuffs of the diamino-triphenylmethane series being salts of an acid represented by the general formula:

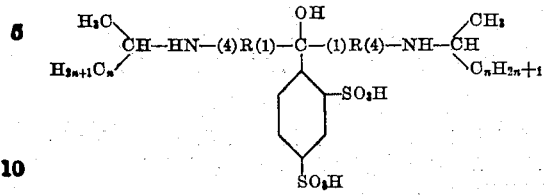

R meaning an aromatic radicle of the benzene series, $n$ meaning a whole number; these dyestuffs in the shape of their dry sodium salts being dark powders soluble in water with a blue color and dyeing wool blue tints.

4. The new dyestuff of the diamino-triphenylmethane series being a salt of an acid represented by the following formula:

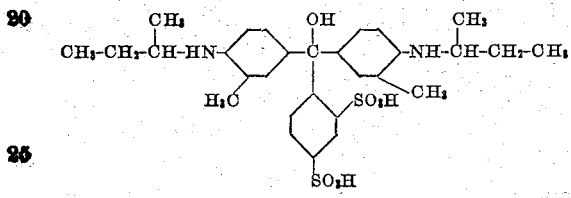

this dyestuff in the shape of its dry sodium salt being a dark powder soluble in water with a blue color and dyeing wool blue tints.

5. The new dyestuff of the diamino-triphenylmethane series being a salt of an acid represented by the following formula:

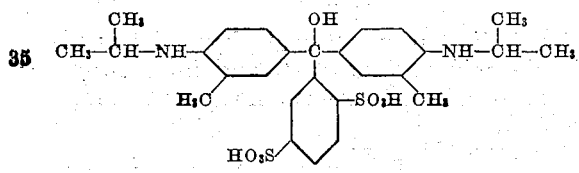

this dyestuff in the shape of its dry sodium salt being a dark powder soluble in water with a blue color and dyeing wool blue tints.

In testimony whereof, we affix our signatures.

OTTO BÖGER.
OSWALD MEISSNER.